US008058341B2

(12) United States Patent
Tosaki et al.

(10) Patent No.: US 8,058,341 B2
(45) Date of Patent: Nov. 15, 2011

(54) AQUEOUS DISPERSION TYPE PRESSURE-SENSITIVE ADHESIVE COMPOSITION AND PRESSURE-SENSITIVE ADHESIVE PRODUCT

(75) Inventors: Yutaka Tosaki, Ibaraki (JP); Hideki Nagatsu, Ibaraki (JP); Shinichi Kouno, Ibaraki (JP); Takahiro Yatagai, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 730 days.

(21) Appl. No.: 10/364,371

(22) Filed: Feb. 12, 2003

(65) Prior Publication Data

US 2003/0162886 A1   Aug. 28, 2003

(30) Foreign Application Priority Data

Feb. 25, 2002   (JP) .............................. P. 2002-047984

(51) Int. Cl.
*C09J 133/00* (2006.01)
*C09J 7/02* (2006.01)
*C09J 9/00* (2006.01)
*C09J 107/00* (2006.01)
*C09J 107/02* (2006.01)
*C09J 109/00* (2006.01)
*C09J 113/00* (2006.01)

(52) U.S. Cl. ........ 524/458; 524/460; 524/502; 524/503; 524/516; 524/522; 526/931

(58) Field of Classification Search .................. 524/458, 524/460, 502, 503, 516, 522; 526/931
See application file for complete search history.

(56) References Cited

U.S. PATENT DOCUMENTS

| | | | |
|---|---|---|---|
| 3,645,835 A | 2/1972 | Hodgson | |
| 4,033,918 A * | 7/1977 | Hauber | 524/296 |
| 4,056,497 A * | 11/1977 | Reinecke et al. | 524/831 |
| 4,076,661 A * | 2/1978 | Kassner | 524/45 |
| 4,128,518 A * | 12/1978 | Oyamada et al. | 524/501 |
| 4,492,724 A | 1/1985 | Allbright et al. | |
| RE31,886 E | 5/1985 | Hodgson | |
| RE31,887 E | 5/1985 | Hodgson | |
| 4,659,771 A * | 4/1987 | Craig | 524/700 |
| 4,670,505 A | 6/1987 | Craig | |
| 4,694,056 A * | 9/1987 | Lenney | 526/202 |
| 4,725,639 A * | 2/1988 | Lenney | 524/460 |
| 5,270,358 A | 12/1993 | Asmus | |
| 5,338,814 A * | 8/1994 | Wu et al. | 526/210 |
| 5,350,631 A * | 9/1994 | Tseng et al. | 428/343 |
| 5,369,155 A | 11/1994 | Asmus | |
| 5,512,612 A | 4/1996 | Brown et al. | |
| 5,571,617 A | 11/1996 | Cooprider et al. | |
| 5,641,567 A | 6/1997 | Brown et al. | |
| 5,834,538 A * | 11/1998 | deHullu et al. | 524/22 |
| 5,952,000 A * | 9/1999 | Venkateshwaran et al. | 424/448 |
| 6,001,913 A * | 12/1999 | Thames et al. | 524/398 |

FOREIGN PATENT DOCUMENTS

| | | | |
|---|---|---|---|
| EP | 0239348 A2 | | 9/1987 |
| EP | 1340797 A2 | | 9/2003 |
| EP | 1418213 A1 | | 5/2004 |
| GB | 1 280 631 A | | 7/1972 |
| GB | 1 409 594 A | | 10/1975 |
| GB | 1409594 A | * | 9/1976 |
| JP | 59-78280 A | | 5/1984 |
| JP | 60-245651 A | | 12/1985 |
| JP | 61-254678 A | | 11/1986 |
| JP | 63-227682 | | 9/1988 |
| JP | 63227682 A | * | 9/1988 |
| JP | 02-006584 A | | 1/1990 |
| JP | 247513 B2 | | 10/1990 |
| JP | 03-079671 A | | 4/1991 |
| JP | 04-103653 A | | 4/1992 |
| JP | 4-31509 B2 | | 5/1992 |
| JP | 5-503863 A | | 6/1993 |
| JP | 07-109446 A | | 4/1995 |
| JP | 08-053652 A | | 2/1996 |
| JP | 8-120251 | | 5/1996 |
| JP | 8-157783 | | 6/1996 |
| JP | 08-217946 A | | 8/1996 |
| JP | 08245706 A | * | 9/1996 |
| JP | 9-511538 A | | 11/1997 |
| JP | 10-158609 | | 6/1998 |
| JP | 10158609 A | * | 6/1998 |
| JP | 10158620 A | * | 6/1998 |
| JP | 10-292162 | | 11/1998 |
| JP | 10-330693 A | | 12/1998 |
| JP | 63-317575 | | 12/1998 |
| JP | 3026700 B2 | | 1/2000 |
| JP | 2000-044904 A | | 2/2000 |
| JP | 2000-239633 | | 9/2000 |

(Continued)

OTHER PUBLICATIONS

Translation to JP 08245706 (Sep. 1996).*
Translation to JP 10158620 (Jun. 1998).*
Aldrich Katalog Deutschland 2003-2004, pp. 1674-1675.

*Primary Examiner* — Kelechi Egwim

(74) *Attorney, Agent, or Firm* — Sughrue Mion, PLLC

(57) ABSTRACT

An aqueous dispersion type pressure-sensitive adhesive composition contains an acrylic or rubber-based pressure-sensitive adhesive composition of the aqueous dispersion type and at least one hydrophilic polymer selected from the group consisting of polyalkylene glycols, polyvinylpyrrolidone, poly(vinyl alcohol)s, and poly((meth)acrylic acid), the amount of the hydrophilic polymer being from 0.5 to 15 parts by weight per 100 parts by weight, on a solid basis, of the acrylic or rubber-based pressure-sensitive adhesive composition of the aqueous dispersion type, and a pressure-sensitive adhesive product has a pressure-sensitive adhesive layer formed from the aqueous dispersion type pressure-sensitive adhesive composition.

3 Claims, No Drawings

FOREIGN PATENT DOCUMENTS

| | | |
|---|---|---|
| JP | 2001-152118 A | 6/2001 |
| JP | 2001-172579 | 6/2001 |
| JP | 2001-515091 A | 9/2001 |
| JP | 2002-155251 A | 5/2002 |
| JP | 2003-503539 A | 1/2003 |
| JP | 2003-041124 A | 2/2003 |
| WO | 99/11728 A1 | 3/1999 |
| WO | 00/78884 A1 | 12/2000 |

\* cited by examiner

AQUEOUS DISPERSION TYPE PRESSURE-SENSITIVE ADHESIVE COMPOSITION AND PRESSURE-SENSITIVE ADHESIVE PRODUCT

FIELD OF THE INVENTION

The present invention relates to an aqueous dispersion type pressure-sensitive adhesive composition and a pressure-sensitive adhesive product.

BACKGROUND OF THE INVENTION

Pressure-sensitive adhesives are extensively used in masking tapes, double-faced pressure-sensitive adhesive tapes, surface-protective films, packaging tapes, and the like. Developments in pressure-sensitive adhesives of the aqueous dispersion type containing no organic solvent have hitherto been proceeding from the standpoints of a measure for environmental protection, resource saving, safety, etc., and the amount of the aqueous dispersion type pressure-sensitive adhesives to be used tends to increase. Of such aqueous dispersion type pressure-sensitive adhesives, rubber-based pressure-sensitive adhesives of the aqueous dispersion type have advantages such as reduced limitations on adherend selection and excellent low-temperature adhesiveness and are hence presently used most extensively. Acrylic pressure-sensitive adhesives of the aqueous dispersion type are coming to be widely used in place of the existing rubber-based pressure-sensitive adhesives of the aqueous dispersion type because of their excellent adhesive properties, weatherability, etc.

On the other hand, masking tapes, for example, have had the following problem. When a masking tape, which is a tape for masking adherends in painting, sealing, or the like, is applied in the rainy season or low-temperature winter season to an adherend surface where dew condensation has occurred, there are cases where sufficient adhesive force cannot be obtained in the application and tape shifting or peeling occurs, leading to reduced applicability. Double-faced pressure-sensitive adhesive tapes and the like also have had the same problem in application to dewy surfaces.

A pressure-sensitive adhesive tape containing a water-soluble polymer as a major component has been disclosed as an adhesive tape having satisfactory adhesiveness to dewy surfaces. However, satisfactory results have not been obtained therewith, for example, because low-molecular components which have been dissolved away as a result of water absorption/swelling cause fouling upon peeling and the pressure-sensitive adhesive has insufficient cohesive force and hence leaves an adhesive residue upon peeling.

SUMMARY OF THE INVENTION

Accordingly, an object of the invention is to provide an aqueous dispersion type pressure-sensitive adhesive composition and a pressure-sensitive adhesive product which are capable of exhibiting satisfactory initial pressure-sensitive adhesive force in application to dewy or wet surfaces.

The present inventors made intensive investigations in order to accomplish that object. As a result, it has been found that when a specific hydrophilic polymer is added in a specific amount to an aqueous dispersion type pressure-sensitive adhesive composition, then the initial pressure-sensitive adhesive force of the adhesive in application to dewy or wet surfaces is improved. The invention has been thus completed.

The invention provides an aqueous dispersion type pressure-sensitive adhesive composition which comprises an acrylic or rubber-based pressure-sensitive adhesive composition of the aqueous dispersion type and at least one hydrophilic polymer selected from the group consisting of polyalkylene glycols, polyvinylpyrrolidone, poly(vinyl alcohol)s, and poly((meth)acrylic acid), the amount of the hydrophilic polymer being from 0.5 to 15 parts by weight per 100 parts by weight, on a solid basis, of the acrylic or rubber-based pressure-sensitive adhesive composition of the aqueous dispersion type.

The acrylic pressure-sensitive adhesive composition of the aqueous dispersion type preferably contains as a base polymer an acrylic polymer comprising, as the main monomer units, units derived from at least one $C_{4\text{-}12}$ alkyl ester of (meth)acrylic acid. The hydrophilic polymer may have a weight-average molecular weight of from 500 to 5,000,000.

The invention further provides a pressure-sensitive adhesive product which has a pressure-sensitive adhesive layer formed from the aqueous dispersion type pressure-sensitive adhesive composition described above. This pressure-sensitive adhesive layer formed from the aqueous dispersion type pressure-sensitive adhesive composition may have been disposed on at least one side of a porous base material.

DETAILED DESCRIPTION OF THE INVENTION

<Aqueous Dispersion Type Pressure-Sensitive Adhesive Composition>

The acrylic or rubber-based pressure-sensitive adhesive composition of the aqueous dispersion type includes an acrylic pressure-sensitive adhesive composition of the aqueous dispersion type and a rubber-based pressure-sensitive adhesive composition of the aqueous dispersion type. Acrylic or rubber-based pressure-sensitive adhesive compositions of the aqueous dispersion type can be used alone or in combination of two or more thereof.

The acrylic pressure-sensitive adhesive composition of the aqueous dispersion type comprises an acrylic pressure-sensitive adhesive containing an acrylic polymer as the base polymer. This acrylic polymer comprises (meth)acrylic acid ester units as the main monomer units and may optionally contain comonomer units derived from one or more copolymerizable monomers. Such acrylic polymers can be used alone or in combination of two or more thereof. Preferably used as the (meth)acrylic acid ester for forming the main monomer units is, for example, a $C_{4\text{-}12}$ alkyl ester of (meth)acrylic acid.

Examples of the $C_{4\text{-}12}$ alkyl ester of (meth)acrylic acid include n-butyl (meth)acrylate, isobutyl (meth)acrylate, sec-butyl (meth)acrylate, t-butyl (meth)acrylate, pentyl (meth)acrylate, isopentyl (meth)acrylate, neopentyl (meth)acrylate, hexyl (meth)acrylate, heptyl (meth)acrylate, octyl (meth)acrylate, isooctyl (meth)acrylate, 2-ethylhexyl (meth)acrylate, nonyl (meth)acrylate, isononyl (meth)acrylate, decyl (meth)acrylate, isodecyl (meth)acrylate, undecyl (meth)acrylate, and dodecyl (meth)acrylate. Such $C_{4\text{-}12}$ alkyl esters of (meth)acrylic acid can be used alone or in combination of two or more thereof.

It is preferred that one or more $C_{4\text{-}12}$ alkyl esters of (meth)acrylic acid should have been incorporated as the main monomer units in the acrylic polymer. It is therefore important that the proportion of monomer units derived from $C_{4\text{-}12}$ alkyl esters of (meth)acrylic acid be 50% by weight or higher based on all monomer units in the acrylic polymer. The proportion thereof is preferably 60% by weight or higher, more preferably 70% by weight or higher. The upper limit of the content of the monomer units derived from $C_{4\text{-}12}$ alkyl esters of (meth)acrylic acid is not particularly limited and may be, for example, 100% by weight (preferably 99% by weight, more preferably 98% by weight) based on all monomer units in the acrylic polymer. Consequently, the proportion of the monomer units derived from $C_{4-12}$ alkyl esters of (meth)acrylic acid may be, for example, from 50 to 98% by weight based on all monomer units. When the content of the monomer units derived from $C_{4-12}$ alkyl esters of (meth)acrylic acid is lower than 50% by weight based on all monomer units, there are cases where a pressure-sensitive adhesive showing satisfactory peeling force and cohesive force cannot be obtained.

Preferred in the invention among the $C_{4-12}$ alkyl esters of (meth)acrylic acid enumerated above are butyl acrylate, 2-ethylhexyl acrylate, isononyl acrylate, dodecyl acrylate (lauryl acrylate), butyl methacrylate, and dodecyl methacrylate (lauryl methacrylate).

Copolymerizable monomers to be incorporated as comonomer units in the acrylic polymer are suitably selected according to the kinds of $C_{4-12}$ alkyl esters of (meth)acrylic acid, etc. Examples of the monomers copolymerizable with $C_{4-12}$ alkyl esters of (meth)acrylic acid include $C_{1-3}$ alkyl esters of (meth)acrylic acid, such as methyl (meth)acrylate, ethyl (meth)acrylate, n-propyl (meth)acrylate, and isopropyl (meth)acrylate; $C_{13-18}$ alkyl esters of (meth)acrylic acid, such as tridecyl (meth)acrylate, tetradecyl (meth)acrylate, pentadecyl (meth)acrylate, hexadecyl (meth)acrylate, and stearyl (meth)acrylate; (meth)acrylic acid cyclic hydrocarbon esters such as cyclohexyl (meth)acrylate, bornyl (meth)acrylate, and isobornyl (meth)acrylate; carboxyl-containing monomers such as (meth)acrylic acid, itaconic acid, maleic acid, fumaric acid, crotonic acid, and isocrotonic acid or the anhydrides thereof; sulfo-containing monomers such as sodium vinylsulfonate; aromatic vinyl compounds such as styrene and substituted styrenes; cyano-containing monomers such as acrylonitrile; olefins such as ethylene and butadiene; vinyl esters such as vinyl acetate; vinyl chloride; amide group-containing monomers such as acrylamide, methacrylamide, N-vinylpyrrolidone, and N,N-dimethyl(meth)acrylamide; hydroxyl-containing monomers such as hydroxyalkyl (meth) acrylates and glycerol dimethacrylate; amino-containing monomers such as aminoethyl (meth)acrylate and (meth) acryloylmorpholine; imide group-containing monomers such as cyclohexylmaleimide and isopropylmaleimide; epoxy group-containing monomers such as glycidyl (meth)acrylate and methylglycidyl (meth)acrylate; and isocyanate group-containing monomers such as 2-methacryloyloxyethyl isocyanate. As the copolymerizable monomers may also be used polyfunctional copolymerizable monomers (polyfunctional monomers) such as triethylene glycol di(meth)acrylate, diethylene glycol di (meth) acrylate, ethylene glycol di(meth) acrylate, tetraethylene glycol di(meth)acrylate, neopentyl glycol di (meth) acrylate, 1,6-hexanediol di(meth)acrylate, trimethylolpropane tri(meth)acrylate, pentaerythritol tri (meth)acrylate, dipentaerythritol hexa (meth) acrylate, and divinylbenzene. Such copolymerizable monomers may be used alone or in combination of two or more thereof.

A crosslinking agent may be used in the invention in place of (or together with) any of the polyfunctional monomers shown above. This crosslinking agent can be added after polymerization for acrylic polymer production and before application to an adherend, so as to improve the cohesive force of the pressure-sensitive adhesive. As this crosslinking agent can be used a crosslinking agent for ordinary use. For example, it may be either a water-soluble crosslinking agent or an oil-soluble crosslinking agent. A single crosslinking agent or a combination of two or more crosslinking agents can be used. Examples of the water-soluble crosslinking agent include epoxy crosslinking agents such as polyethylene glycol diglycidyl ether, water-dispersible isocyanate crosslinking agents, oxazoline crosslinking agents, aziridine crosslinking agents, hydrophilized carbodiimide crosslinking agents, crosslinking agents containing an active methylol group or active alkoxymethyl group, metal chelate crosslinking agents, melamine resin crosslinking agents, and peroxide crosslinking agents. Examples of the oil-soluble crosslinking agent include epoxy crosslinking agents such as N,N,N',N'-tetraglycidyl-m-xylenediamine, isocyanate crosslinking agents such as hexamethylene diisocyanate, and oil-soluble carbodiimide crosslinking agents. The amount of the crosslinking agent to be used is not particularly limited, and may be an amount generally used for acrylic pressure-sensitive adhesives.

Such copolymerizable monomers may be used in such an amount that the content of the units to be formed therefrom is lower than 50% by weight based on all monomer units.

The acrylic polymer can be produced from the monomers shown above by a known or usual polymerization method (especially the emulsion polymerization method). Furthermore, use can generally be made of the en bloc charging method (en bloc polymerization method), monomer dropping method, monomer emulsion dropping method, or the like. In the case where monomers and other components are added dropwise, they may be dropped continuously or in portions. A polymerization temperature can be suitably selected according to the kind of the polymerization initiator, etc., for example, from the range of from 5 to 100° C.

Examples of the polymerization initiator for use in the polymerization include azo initiators such as 2,2'-azobisisobutyronitrile, 2,2'-azobis(2-amidinopropane) dihydrochloride, 2,2'-azobis[2-(5-methyl-2-imidazolin-2-yl)propane] dihydrochloride, 2,2'-azobis(2-methylpropionamidine) disulfate, and 2,2'-azobis(N,N'-dimethyleneisobutyramidine) dihydrochloride; persulfates such as potassium persulfate and ammonium persulfate; peroxide initiators such as benzoyl peroxide, t-butyl hydroperoxide, and hydrogen peroxide; and redox initiators comprising a combination of a peroxide and a reducing agent, such as a combination of a persulfate and sodium hydrogen sulfite and a combination of a peroxide and sodium ascorbic acid. However, the polymerization initiator should not be construed as being limited to these. The polymerization initiator may be a water-soluble initiator or an oil-soluble initiator. The amount of the polymerization initiator to be used may be suitably selected according to the kind thereof, kinds of the monomers, etc. However, the amount thereof can generally be selected from the range of, for example, about from 0.01 to 1 part by weight per 100 parts by weight of the monomer components.

A chain-transfer agent may be used for the polymerization. By using a chain-transfer agent, the molecular weight of the acrylic polymer can be regulated. Examples of the chain-transfer agent include ordinary chain-transfer agents such as, e.g., lauryl mercaptan, glycidyl mercaptan, mercaptoacetic acid, 2-mercaptoethanol, thioglycolic acid, 2-ethylhexyl thioglycolate, and 2,3-dimercapto-1-propanol. These may be used alone or in combination of two or more thereof. The amount of the chain-transfer agent to be used is generally about from 0.001 to 0.5 parts by weight per 100 parts by weight of the monomer components.

An emulsifying agent can be further used in the polymerization for the purpose of securing polymerization stability. Examples of emulsifying agents usable for this purpose include anionic emulsifying agents such as sodium lauryl sulfate, ammonium lauryl sulfate, sodium dodecylbenzenesulfonate, sodium polyoxyethylene alkyl ether sulfates, ammonium polyoxyethylene alkylphenyl ether sulfates, sodium polyoxyethylene alkylphenyl ether sulfates, and sodium polyoxyethylene alkyl sulfosuccinates; and nonionic emulsifying agents such as polyoxyethylene alkyl ethers, polyoxyethylene alkylphenyl ethers, polyoxyethylene fatty acid esters, and polyoxyethylene/polyoxypropylene block polymers. Also usable are radical-polymerizable emulsifying agents obtained by incorporating a radical-reactive group such as, e.g., a propenyl group into these emulsifying agents. Such emulsifying agents may be used alone or in combination of two or more thereof. The amount of the emulsifying agent to be used is, for example, preferably 0.5 parts by weight or larger, more preferably 1.0 part by weight or larger, per 100 parts by weight of the monomer components from the standpoints of polymerization stability and mechanical stability. On the other hand, from the standpoint of improving water resistance, the amount thereof is preferably 5 parts by weight or smaller, more preferably 3 parts by weight or smaller.

A monomer composition and the amount or proportion of each monomer to be used can be suitably selected as long as an acrylic polymer comprising units derived from one or more $C_{4-12}$ alkyl esters of (meth)acrylic acid as the main monomer units is obtained. It is, however, desirable for attaining satisfactory pressure-sensitive adhesive properties that a monomer composition and proportions thereof be determined so as to yield a polymer having a glass transition point ($T_g$) of generally −20° C. or lower.

The weight-average molecular weight of the acrylic polymer may be about 200,000 or higher (e.g., from 200,000 to 1,000,000), preferably about from 250,000 to 900,000, more preferably about from 300,000 to 800,000.

In the acrylic pressure-sensitive adhesive, the acrylic polymer is contained in an aqueous dispersion state. Consequently, the acrylic polymer may be contained in the form of an emulsion. In the case where the acrylic polymer is contained in an emulsion form, an emulsified acrylic polymer may be prepared by optionally using an emulsifying agent in producing the acrylic polymer through polymerization. Alternatively, an acrylic polymer produced by any of various polymerization methods may be emulsified with an emulsifying agent. Namely, the emulsion containing an acrylic polymer may be an acrylic-polymer emulsion obtained by the emulsion polymerization of one or more $C_{4-12}$ alkyl esters of (meth)acrylic acid optionally with one or more copolymerizable monomers, or may be an acrylic-polymer emulsion prepared by obtaining an acrylic polymer by a polymerization method other than emulsion polymerization and then dispersing the polymer in water with an emulsifying agent.

On the other hand, the rubber-based pressure-sensitive adhesive composition of the aqueous dispersion type is constituted of a rubber-based pressure-sensitive adhesive comprising a natural-rubber latex as the main component. This rubber-based pressure-sensitive adhesive may contain, according to need, a latex of natural rubber which has been masticated or to which an acrylic or another monomer has been grafted.

In the aqueous dispersion type pressure-sensitive adhesive composition, the acrylic pressure-sensitive adhesive composition of the aqueous dispersion type can be an aqueous dispersion type pressure-sensitive adhesive containing an acrylic pressure-sensitive adhesive as the main component, while the rubber-based pressure-sensitive adhesive composition of the aqueous dispersion type can be an aqueous dispersion type pressure-sensitive adhesive composition containing a rubber-based pressure-sensitive adhesive as the main component.

The acrylic or rubber-based adhesive composition of the aqueous dispersion type may contain, according to need, a base (e.g., ammonia water) or acid for pH regulation and further contain additives in ordinary use in pressure-sensitive adhesives. Examples of such additives include peelability regulators, tackifiers, plasticizers, softeners, fillers, colorants (e.g., pigments and dyes), antioxidants, and surfactants.

<Hydrophilic Polymer>

At least one hydrophilic polymer is contained in the aqueous dispersion type pressure-sensitive adhesive composition of the invention in an amount of from 0.5 to 15 parts by weight (preferably from 1 to 13 parts by weight, more preferably from 1.5 to 10 parts by weight) per 100 parts by weight, on a solid basis, of the acrylic or rubber-based pressure-sensitive adhesive composition of the aqueous dispersion type. When the proportion of the hydrophilic polymer to be used is less than 0.5 parts by weight per 100 parts by weight, on a solid basis, of the aqueous dispersion type pressure-sensitive adhesive composition, there are cases where the effect of improving pressure-sensitive adhesive force in application to dewy or wet surfaces is lessened. On the other hand, proportions thereof higher than 15 parts by weight result in an increased viscosity of the pressure-sensitive adhesive and this may influence applicability. Any method may be used for incorporating the hydrophilic polymer, as long as it is contained together with an acrylic pressure-sensitive adhesive or rubber-based pressure-sensitive adhesive. For example, in the case of an acrylic pressure-sensitive adhesive composition of the aqueous dispersion type, the hydrophilic polymer may be incorporated before an acrylic polymer for constituting the acrylic pressure-sensitive adhesive is produced by polymerization. However, for avoiding adverse influences on the polymerization for acrylic polymer production, it is preferred to add the hydrophilic polymer in the form of an aqueous solution after the polymerization for acrylic polymer production.

As the hydrophilic polymer can be used a polyalkylene glycol, polyvinylpyrrolidone, polyvinyl alcohol), or poly((meth)acrylic acid). These hydrophilic polymers can be used alone or in combination of two or more thereof. Examples of the polyalkylene glycol include homopolymers such as polyethylene glycol and polypropylene glycol and copolymers such as ethylene glycol/propylene glycol copolymers. Preferred as the polyvinylpyrrolidone is polyvinylpyrrolidone as a homopolymer. However, copolymers of vinylpyrrolidone with one or more other copolymerizable monomers also can be used as long as they are hydrophilic. As the poly(vinyl alcohol) can be used a known or ordinary poly(vinyl alcohol). The poly(vinyl alcohol) is not particularly limited in the degree of saponification as long as it is hydrophilic. As the poly((meth)acrylic acid) can be used a homopolymer such as poly(acrylic acid) or poly(methacrylic acid) or a copolymer such as an acrylic acid/methacrylic acid copolymer. Besides these, copolymers of acrylic acid and/or methacrylic acid with one or more other copolymerizable monomers are also usable as long as they are hydrophilic.

The weight-average molecular weight of the hydrophilic polymer is not particularly limited, and can be selected in the range of, for example, about from $0.5 \times 10^3$ to $5 \times 10^6$ (preferably about from $0.8 \times 10^3$ to $3 \times 10^6$, more preferably about from $2 \times 10^3$ to $1 \times 10^6$). When the hydrophilic polymer has too low a weight-average molecular weight, there are cases where the effect of improving pressure-sensitive adhesive force in application to dewy or wet surfaces is lessened. On the other hand, too high weight-average molecular weights thereof result in an increased viscosity of the pressure-sensitive adhesive and this may influence applicability. In the case where the weight-average molecular weight of the hydrophilic polymer is from $2 \times 10^3$ to $1 \times 10^6$, a highly excellent balance is obtained between the effect of improving adhesive force in application to dewy or wet surfaces and applicability.

Especially preferred examples of the hydrophilic polymer are polyethylene glycol and polyvinylpyrrolidone from the standpoints of the addition amount thereof, weight-average molecular weight, and balance among the effect of improving adhesive force in application to dewy or wet surfaces, applicability, etc.

The aqueous dispersion type pressure-sensitive adhesive composition of the invention (i.e., the aqueous dispersion type pressure-sensitive adhesive composition containing a hydrophilic polymer) contains at least one hydrophilic polymer selected from polyalkylene glycols, polyvinylpyrrolidone, poly(vinyl alcohol)s, and poly((meth)acrylic acid) in an amount of from 0.5 to 15 parts by weight per 100 parts by weight, on a solid basis, of the acrylic or rubber-based pressure-sensitive adhesive composition of the aqueous dispersion type. Because of this, the adhesive composition of the invention can exhibit satisfactory initial pressure-sensitive adhesive force in application to dewy or wet surfaces although it is an aqueous dispersion type pressure-sensitive adhesive composition. Furthermore, the pressure-sensitive adhesive, during peeling, is inhibited or prevented from posing the problem of fouling due to low-molecular components dissolved away as a result of water absorption/swelling or the problem of leaving an adhesive residue due to insufficient cohesive force. Since the acrylic or rubber-based pressure-sensitive adhesive is an aqueous composition, use thereof is desirable also from the standpoints of safety, environmental hygiene, etc. In addition, the pressure-sensitive adhesive properties inherent in the acrylic or rubber-based pressure-sensitive adhesive remain intact or almost intact, and the excellent pressure-sensitive adhesive properties inherent in the acrylic or rubber-based pressure-sensitive adhesive can be exhibited. Therefore, the aqueous dispersion type pressure-sensitive adhesive composition of the invention is useful as an aqueous dispersion type pressure-sensitive adhesive for forming a pressure-sensitive adhesive layer in a pressure-sensitive adhesive product.

<Pressure-Sensitive Adhesive Product>

Examples of the pressure-sensitive adhesive product of the invention include pressure-sensitive adhesive tapes, pressure-sensitive adhesive sheets, pressure-sensitive adhesive films, and pressure-sensitive adhesive labels. The pressure-sensitive adhesive product has a pressure-sensitive adhesive layer formed from the aqueous dispersion type pressure-sensitive adhesive composition containing a hydrophilic polymer. This pressure-sensitive adhesive layer formed from the aqueous dispersion type pressure-sensitive adhesive composition containing a hydrophilic polymer may have been disposed, for example, on at least one side of a base material or on a release film. Namely, the pressure-sensitive adhesive product may be either a pressure-sensitive adhesive product having a base material or a pressure-sensitive adhesive product having no base material, as long as it comprises a pressure-sensitive adhesive layer formed from the aqueous dispersion type pressure-sensitive adhesive composition containing a hydrophilic polymer.

Examples of the base material include plastic films such as polypropylene films, polyolefin films, ethylene/propylene copolymer films, polyester films, polyimide films, poly(vinyl chloride) films, and poly(vinyl acetate) films; metal foils; and porous base materials. In the invention, it is preferred to use a porous base material as the base material. Examples of the porous base material include porous paper base materials such as Japanese paper, kraft paper, and crepe paper; and porous fabric base materials such as nonwoven fabrics and woven fabrics. Especially effective base materials of these in improving initial pressure-sensitive adhesive force in application to dewy or wet surfaces are: Japanese paper in the case where the pressure-sensitive adhesive product is a masking tape; and a nonwoven fabric in the case where the pressure-sensitive adhesive product is a pressure-sensitive adhesive tape such as a double-faced pressure-sensitive adhesive tape.

Preferred Japanese paper is one made from a beaten wood pulp or from a mixture of the wood pulp with short synthetic fibers. Examples of the synthetic polymer constituting the short synthetic fibers include various synthetic polymers such as vinylon, nylons, polyesters, polypropylene, and poly(vinyl chloride).

As the nonwoven fabric can preferably be used, for example, one produced by sheet forming from general fibers and a pulp.

The basis weight of the porous base material is not particularly limited and may be, for example, about from 5 to 200 $g/m^2$. More specifically, the basis weight of the porous base material is generally about from 20 to 100 $g/m^2$ in the case where the porous base material is Japanese paper, and is generally about from 10 to 20 $g/m^2$ in the case of a nonwoven fabric.

The base material can have a thickness suitably selected according to the target pressure-sensitive adhesive product. For example, the thickness thereof may be about from 5 to 300 μm. More specifically, the thickness of the base material is preferably from 40 to 200 μm (especially from 50 to 100 μm) in the case of a Japanese paper base material and is generally from 30 to 50 μm in the case of a nonwoven fabric base material, from the standpoints of strength, nerve, etc.

The base material may have a single-layer or multilayer constitution.

The base material (especially the porous base material) may have undergone an impregnation treatment or filling treatment and any of various known or usual treatments, e.g., a releasant treatment, according to purposes.

The pressure-sensitive adhesive product of the invention can be produced by a process for producing ordinary pressure-sensitive adhesive products, according to the kind of the pressure-sensitive adhesive product. For example, in the case where the pressure-sensitive adhesive product has a base material, it can be produced by subjecting the base material to treatments such as prime coating and back sizing or back treatment, directly applying the aqueous dispersion type pressure-sensitive adhesive composition containing a hydrophilic polymer to at least one side (one side or each side) of the base material in a thickness of about from 5 to 300 μm on a dry basis, and then drying the coating. Alternatively, the product can be obtained by applying the pressure-sensitive adhesive composition to a separator in a thickness of about from 5 to 300 μm on a dry basis, drying the coating, and then transferring the dry coating to the base material. Thus, the pressure-sensitive adhesive product (e.g., a pressure-sensitive adhesive tape in a roll form) can be produced.

For applying the aqueous dispersion type pressure-sensitive adhesive composition, a coater in common use can be employed, such as, e.g., a gravure roll coater, reverse-roll coater, kiss-roll coater, dip roll coater, bar coater, knife coater, or spray coater.

It is desirable in the invention that a release film be superposed on the pressure-sensitive adhesive layer in order to protect the pressure-sensitive adhesive. In the case where a release film is not used, it is preferred that the back side of the base material have undergone a treatment with a release agent such as a silicone release agent or long-chain-alkyl release agent.

The aqueous dispersion type pressure-sensitive adhesive composition of the invention can exhibit satisfactory initial pressure-sensitive adhesive force in application to dewy or wet surfaces.

The invention will be explained below in more detail by reference to Examples, but the invention should not be construed as being limited by these Examples. Hereinafter, all parts are by weight.

PREPARATION EXAMPLE OF ACRYLIC PRESSURE-SENSITIVE ADHESIVE

Into a reaction vessel equipped with a thermometer, stirrer, nitrogen introduction tube, and reflux condenser was introduced an emulsion prepared by emulsifying 46 parts of 2-ethylhexyl acrylate, 2.5 parts of butyl acrylate, 1 part of acrylonitrile, 0.5 part of acrylic acid, and 1 part of sodium lauryl sulfate in 75 parts of water. Nitrogen displacement was conducted at room temperature (25° C.) for 1 hour with stirring. Thereto was then added 0.025 parts of 2,2'-azobis(2-amidinopropane) dihydrochloride (polymerization initiator). The resultant mixture was polymerized at a temperature of 60° C. for 3 hours (first-stage polymerization). Thereafter, 0.1 part of potassium persulfate was further introduced into the vessel. An emulsion prepared by emulsifying 46 parts of 2-ethylhexyl acrylate, 2.5 parts of butyl acrylate, 1 part of acrylonitrile, 0.5 part of acrylic acid, and 1 part of sodium lauryl sulfate in 33 parts of water was added dropwise thereto at 70° C. over 3 hours, during which the reaction mixture was polymerized (second-stage polymerization). The resultant reaction mixture was aged at 75° C. for 2 hours, subsequently cooled to room temperature, and then neutralized with 10% ammonia water. Thus, a pressure-sensitive adhesive (often referred to as "pressure-sensitive adhesive A") was prepared.

Example 1

To 100 parts, on a solid basis, of pressure-sensitive adhesive A were added 2 parts of polyethylene glycol (weight-average molecular weight, 500,000) and 0.3 part of an oil-soluble epoxy crosslinking agent (trade name "Tetrad C", manufactured by Mitsubishi Gas Chemical Company, Inc.). The resultant composition was applied to one side of Japanese paper having a basis weight of 30 g/m² (base material) in a thickness of 20 μm on a dry basis, and the coating was dried. Thus, a pressure-sensitive adhesive tape was obtained.

Example 2

To 100 parts, on a solid basis, of pressure-sensitive adhesive A were added 10 parts of polyvinylpyrrolidone (weight-average molecular weight, 900,000) and 0.3 part of an oil-soluble epoxy crosslinking agent (trade name "Tetrad C", manufactured by Mitsubishi Gas Chemical Company, Inc.). The resultant composition was applied to one side of Japanese paper having a basis weight of 30 g/m² (base material) in a thickness of 20 μm on a dry basis, and the coating was dried. Thus, a pressure-sensitive adhesive tape was obtained.

Example 3

To 100 parts, on a solid basis, of pressure-sensitive adhesive A were added 10 parts of polyethylene glycol (weight-average molecular weight, 1,000) and 0.3 part of an oil-soluble epoxy crosslinking agent (trade name "Tetrad C", manufactured by Mitsubishi Gas Chemical Company, Inc.). The resultant composition was applied to one side of Japanese paper having a basis weight of 30 g/m² (base material) in a thickness of 20 μm on a dry basis, and the coating was dried. Thus, a pressure-sensitive adhesive tape was obtained.

Comparative Example 1

To 100 parts, on a solid basis, of pressure-sensitive adhesive A was added 0.3 parts of an oil-soluble epoxy crosslinking agent (trade name "Tetrad C", manufactured by Mitsubishi Gas Chemical Company, Inc.). The resultant composition was applied to one side of Japanese paper having a basis weight of 30 g/m² (base material) in a thickness of 20 μm on a dry basis, and the coating was dried. Thus, a pressure-sensitive adhesive tape was obtained.

Comparative Example 2

To 100 parts, on a solid basis, of pressure-sensitive adhesive A were added 0.3 part of polyethylene glycol (weight-average molecular weight, 1,000) and 0.3 part of an oil-soluble epoxy crosslinking agent (trade name "Tetrad C", manufactured by Mitsubishi Gas Chemical Company, Inc.). The resultant composition was applied to one side of Japanese paper having a basis weight of 30 g/m² (base material) in a thickness of 20 μm on a dry basis, and the coating was dried. Thus, a pressure-sensitive adhesive tape was obtained.

Evaluation Method

A glass as an adherend was stored for 1 hour in a box having a temperature set at 0° C. which had been installed in a thermo-hygrostatic chamber of 23° C.×65% RH. Thereafter, the glass was taken out of the box (at this time, the glass surfaces were in a dewy or wet state). After ten seconds, a pressure-sensitive adhesive tape cut into a width of 18 mm (the pressure-sensitive adhesive tape obtained in any of Examples 1 to 3 and Comparative Examples 1 and 2) was applied thereto by rolling a 2-kg roller forward and backward once on the tape. At 10 seconds after the application, the tape was peeled off at an angle of 180° and a peeling rate of 300 mm/min to measure the pressure-sensitive adhesive force in application to the dewy or wet glass surface (sometimes referred to as "wet-surface pressure-sensitive adhesive force") (N/18-mm width) The results of this measurement are shown in Table 1.

TABLE 1

|  |  | Example | | | Comparative Example | |
|---|---|---|---|---|---|---|
|  |  | 1 | 2 | 3 | 1 | 2 |
| Hydrophilic polymer | Kind | PEG | PVP | PEG | none | PEG |
|  | $M_w$ | 500,000 | 900,000 | 1,000 | — | 1,000 |
|  | Amount | 2 | 10 | 10 | — | 0.3 |
| Pressure-sensitive adhesive force (N/18-mm width) |  | 0.6 | 0.6 | 0.2 | 0.02 | 0.03 |

PEG: polyethylene glycol
PVP: polyvinylpyrrolidone
$M_w$: weight-average molecular weight
Amount of the hydrophilic polymer is proportion per 100 parts by weight, on solid basis, of pressure-sensitive adhesive A.

Table 1 shows that the pressure-sensitive adhesive tapes obtained in Examples 1 to 3 each were superior to the pressure-sensitive adhesive tapes of Comparative Examples 1 and 2 in pressure-sensitive adhesive force in application to the dewy or wet glass surface. The pressure-sensitive adhesive tapes of the Examples were thus ascertained to have satisfactory pressure-sensitive adhesive force in application to wet surfaces.

While the invention has been described in detail and with reference to specific embodiments thereof, it will be apparent to one skilled in the art that various changes and modifications can be made therein without departing from the spirit and scope thereof.

What is claimed is:

1. An aqueous dispersion type pressure-sensitive adhesive composition which comprises an acrylic based pressure-sensitive adhesive composition of the aqueous dispersion type and a polyvinylpyrrolidone (PVP) hydrophilic polymer, the amount of the hydrophilic polymer being from 10 to 15 parts by weight per 100 parts by weight, on a solid basis, of the acrylic based pressure-sensitive adhesive composition of the aqueous dispersion type, wherein the hydrophilic polymer is added after polymerization, and wherein the hydrophilic polymer has a weight-average molecular weight of from 1,000 to 1,000,000.

2. The aqueous dispersion type pressure-sensitive adhesive composition as claimed in claim 1, wherein the acrylic pressure-sensitive adhesive composition of the aqueous dispersion type contains as a base polymer an acrylic polymer comprising, as the main monomer units, units derived from at least one $C_{4-12}$ alkyl ester of (meth)acrylic acid.

3. The aqueous dispersion type pressure-sensitive adhesive composition as claimed in claim 1, wherein the hydrophilic polymer has a weight-average molecular weight of from 2,000 to 1,000,000.

* * * * *